Patented Sept. 20, 1932

1,877,959

UNITED STATES PATENT OFFICE

HARRY C. PEFFER, RICHARD L. HARRISON, AND DAVID E. ROSS, OF LAFAYETTE, INDIANA, ASSIGNORS TO ROSTONE, INCORPORATED, OF LAFAYETTE, INDIANA, A CORPORATION OF INDIANA

STRUCTURAL MATERIAL AND PROCESS OF MAKING THE SAME

No Drawing. Application filed September 22, 1930. Serial No. 483,747.

This invention is an improvement upon or extension of the process and structural material called "rostone" set forth in our application filed February 18, 1929, Serial No. 341,030 which has become Patent 1,852,672 and may be considered in part a continuation thereof.

As described in our said application in the making of the material "rostone" therein set forth, we employ as essential raw materials (a) a mineral substance, such as slate, shale, and certain clays composed wholly or in part of aluminosilicic acid; (b) lime, magnesia, or other alkaline earth base, and (c) water as an essential reacting agent. In producing such artificial structural material the alkaline earth base and finely ground mineral are mixed with sufficient water to ensure complete reaction, and then so heated as will, without destroying the essential water content of the mass, transform the mass by reaction into a product possessing high compressive and tensile strength and resistant to attack by ordinary chemical reagents. The optimum amount of water necessary in the mass for producing the desired reaction is approximately 25% (based on the dry weight of the solid constituents) as set forth in said application.

Such a mixture can be subjected to heat, in presence of water vapor, to cause the desired reaction between the base, aluminosilicic acid and water and produce the desired product. Or such mixture can be indurated with steam at substantially atmospheric pressure until the mass is transformed into the desired material. While steam is preferably employed other agencies are effective as recited in said application. As described in said application good induration was obtained by the use of steam pressures as low as atmospheric with corresponding temperature of substantially 212° F. but when heating counter current the steam could be held to any desired temperature, dictated by varying composition in the raw materials, but avoiding high pressure; preferably using only sufficient pressure to secure good circulation.

We have discovered that coarse aggregates of various kinds—such as rock, stone, gravel and other hard aggregates, and particularly Indiana limestone and the like, or broken pieces of "rostone",—can be mixed with the aforesaid raw materials prior to induration thereof; and when so mixed and the mass indurated as described the coarse aggregate will be intimately bound together by and with the rostone and form therewith a substantially homogeneous structure or body in which the coarse aggregate is closely bound by the rostone and so inseparably connected therewith and thereby that if the mass should be fractured the fracture would take place through the aggregates as well as through the rostone, and the aggregate cannot separate from the rostone.

By our invention an artificial stone is produced which can be molded into shapes if desired before induration, or which after induration can be chiseled, sawed or tooled; and it can be colored or tinted before induration, and will preserve the color after induration.

In carrying out our process we preferably mix the alkaline earth base, aluminosilicic acid material and crushed aggregate, then add the optimum amount of water, thoroughly mix the same, and then indurate it in the manner above suggested.

As an example; to produce an artificial stone using Indiana limestone as the coarse aggregate, the following proportions of ingredients have been successively used:

22 parts of base material.
100 parts of aluminosilicic acid.
150 parts of crushed Indiana limestone
   (passing through a 14 mesh screen, but
   retained on a 100 mesh screen) and
22 parts of water.

The base, aluminosilicic acid material and aggregate should be first thoroughly mixed, then the water added, and then the mass molded and indurated as set forth in our aforesaid application. The resultant product is a structural material in which the aggregate is intimately and inseparably bonded with and by the "rostone".

Before induration the mass may be molded or otherwise formed into suitable shapes, as in ordinary ceramic practice, and then hardened or indurated as set forth in our aforesaid application.

We claim:

1. The process of producing an artificial structural material; consisting in mixing an alkaline earth base, a finely ground mineral material containing hydrated aluminosilicic acid, a coarse aggregate, and water in optimum quantity to produce complete reaction; and heating the mass while retaining its essential water content until it is transformed into the desired material.

2. The process of producing an artificial structural material; consisting in mixing an alkaline earth base, a finely ground material composed principally of hydrated aluminosilicic acid, a coarse aggregate, and water, in proportions to produce a material possessing high compressive and tensile strength; and subjecting the mass to heat in presence of water vapor to prevent evaporation of essential reacting water until the mass is transformed into the desired material.

3. The herein described process of producing an artificial structural material possessing high compressive and tensile strength and having a binding medium resistant to attack by ordinary chemical reagents; consisting in mixing an alkaline earth base selected from a group consisting of lime and magnesia, a finely ground material composed principally of hydrated aluminosilicic acid, a coarse aggregate, and water; and subjecting the mass to heat while retaining the essential reacting water therein until the mass is transformed into said material.

4. The herein described process of producing an artificial structural material; consisting in mixing an alkaline earth base, and a finely ground material composed principally of hydrated aluminosilicic acid, adding a coarse aggregate and water to the mass, and subjecting the mass to heat until it is transformed into the desired material.

5. The herein described process of producing an artificial structural material; consisting in mixing an alkaline earth base and a finely ground material composed principally of hydrated aluminosilicic acid, adding a coarse aggregate; then adding sufficient water to the mass to cause complete reaction, and subjecting the mass to heat in presence of water vapor to prevent evaporation of essential reacting water until the mass is transformed into the desired material.

6. The herein described artificial structural material possessing high compressive and tensile strength; produced by mixing an alkaline earth base, a finely ground mineral material containing hydrated aluminosilicic acid, a coarse aggregate, and water in optimum quantity to produce complete reaction; and heating the mass while retaining its essential water content until it is transformed into the desired product.

7. The herein described artificial structural material possessing high compressive and tensile strength; produced by mixing an alkaline earth base, a finely ground material composed principally of hydrated aluminosilicic acid, a coarse aggregate, and water; and subjecting the mass to heat in presence of water vapor to prevent evaporation of essential reacting water until the mass is transformed into the desired material.

8. The herein described artificial structural material possessing high compressive and tensile strength and having a binding medium resistant to attack by ordinary chemical reagents; produced by mixing an alkaline earth base selected from a group consisting of lime and magnesia, a finely ground material composed principally of hydrated aluminosilicic acid, a coarse aggregate, and water; and subjecting the mass to heat while retaining the essential reacting water until the mass is transformed into said material.

9. The herein described artificial structural material possessing high compressive and tensile strength; produced by mixing an alkaline earth base selected from a group consisting of lime and magnesia, a finely ground material composed principally of hydrated aluminosilicic acid, a coarse natural stone aggregate, and water, in proportions to produce the material; and subjecting the mass to heat in presence of water vapor to prevent evaporation of essential reacting water until the mass is transformed.

10. The herein described artificial structural material; produced by mixing an alkaline earth base, a finely ground material composed principally of hydrated aluminosilicic acid, and a coarse aggregate; adding water in optimum quantity to produce complete reaction; and then subjecting the mass to heat until the mass is transformed into the desired material.

11. The herein described artificial structural material possessing high compressive and tensile strength and having binding medium resistant to attack by ordinary chemical reagents; produced by mixing an alkaline earth base selected from a group consisting of lime and magnesia, a finely ground material composed principally of hydrated aluminosilicic acid, and a coarse aggregate; adding water to the mixture, and finally subjecting the mass to heat and retaining the essential reacting water until the mass is transformed into said material.

12. The herein described artificial structural material resistant to ordinary chemical reagents; produced by mixing an alkaline earth base, a finely ground mineral material containing hydrated aluminosilicic acid and a coarse aggregate, adding thereto sufficient water to cause complete reaction, and finally indurating the mass with steam at substantially atmospheric pressure, until the mass is transformed into the said material.

HARRY C. PEFFER.
RICHARD L. HARRISON.
DAVID E. ROSS.